(12) United States Patent
Semple et al.

(10) Patent No.: US 10,077,869 B2
(45) Date of Patent: Sep. 18, 2018

(54) SUPPORT STRUCTURE FOR A SHIELD AND WEAPONS SYSTEM

(71) Applicants: Jason John Semple, Robina (AU); Andrew Erle Butler, Star, ID (US); Timothy Michael Russell, Beaumaris (AU)

(72) Inventors: Jason John Semple, Robina (AU); Andrew Erle Butler, Star, ID (US); Timothy Michael Russell, Beaumaris (AU)

( * ) Notice: Subject to any disclaimer, the term of this patent is extended or adjusted under 35 U.S.C. 154(b) by 0 days.

(21) Appl. No.: 15/666,852

(22) Filed: Aug. 2, 2017

(65) Prior Publication Data
US 2017/0343155 A1 Nov. 30, 2017

Related U.S. Application Data

(60) Division of application No. 15/331,938, filed on Oct. 24, 2016, which is a continuation-in-part of application No. 14/842,759, filed on Sep. 1, 2015, now Pat. No. 9,810,509.
(Continued)

(51) Int. Cl.
*F16M 13/04* (2006.01)
*F41C 33/00* (2006.01)
(Continued)

(52) U.S. Cl.
CPC .......... *F16M 13/04* (2013.01); *F16M 11/046* (2013.01); *F41C 33/001* (2013.01); *F41H 5/08* (2013.01); *F41C 33/007* (2013.01)

(58) Field of Classification Search
CPC ..... F16M 13/04; F41C 33/001; F41C 33/007; F41H 5/08; G02B 7/002; G02B 17/561;
(Continued)

(56) References Cited

U.S. PATENT DOCUMENTS 4,483,070 A * 11/1984 Junkermann ............ A01G 3/08
224/185
6,481,108 B1 * 11/2002 Helinski ............... B25H 1/0028
224/262
(Continued)

FOREIGN PATENT DOCUMENTS

WO         WO 95/25926         9/1995

OTHER PUBLICATIONS

Easyrig AB, "Easyrig 3 Cinema User Manual," Date of Publication Unknown.
(Continued)

*Primary Examiner* — Adam Waggenspack
(74) *Attorney, Agent, or Firm* — Bennett K. Langlotz; Langlotz Patent & Trademark Works, Inc.

(57) ABSTRACT

A support structure for a shield has a frame adapted for connection to a wearer, the frame having an elongated first portion defining a frame axis and adapted for positioning adjacent to the spine of the wearer, the frame having an upper end, a boom connected to the upper end of the frame and having a first boom portion extending away from the frame, and a second boom portion angled with respect to the first boom portion and extending away from the frame axis, the boom having a free end, a cable reel mechanism connected to the frame, a cable having a first end connected to the cable reel mechanism and a free end extending from the free end of the boom and adapted to connect to the shield, and the cable reel mechanism including a biasing facility to exert tension on the cable to provide support for the shield.

5 Claims, 18 Drawing Sheets

Related U.S. Application Data

(60) Provisional application No. 62/159,894, filed on May 11, 2015.

(51) Int. Cl.
*F16M 11/04* (2006.01)
*F41H 5/08* (2006.01)

(58) Field of Classification Search
CPC . B65D 1/60; B65D 3/04; B65D 3/043; B65D 3/08; B65D 2700/028
USPC .................................................. 224/162, 908
See application file for complete search history.

(56) References Cited

U.S. PATENT DOCUMENTS

| | | | |
|---|---|---|---|
| 7,520,206 B2* | 4/2009 | Baker | F41H 5/08 89/36.05 |
| 9,052,156 B2* | 6/2015 | Nevils | F41C 33/001 |
| 9,328,992 B1* | 5/2016 | Smith | F41C 33/001 |
| 2009/0025546 A1* | 1/2009 | White | F41H 5/08 89/36.02 |
| 2009/0064560 A1* | 3/2009 | Saunders, III | F41A 23/18 42/94 |
| 2014/0233235 A1* | 8/2014 | Micarelli | F41H 5/08 362/253 |

OTHER PUBLICATIONS

Easyrig AB, "Easyrig 3 Cinema Brochure," Date of Publication Unknown.

\* cited by examiner

SUPPORT STRUCTURE FOR A SHIELD AND WEAPONS SYSTEM

CROSS-REFERENCE TO RELATED APPLICATION

This is a Division of U.S. patent application Ser. No. 15/331,938, entitled "SUPPORT STRUCTURE FOR A WEAPONS SYSTEM," filed Oct. 24, 2016, which is a Continuation-in-Part of U.S. patent application Ser. No. 14/842,759, entitled "SUPPORT STRUCTURE FOR A WEAPONS SYSTEM," filed Sep. 1, 2015, which claims the benefit of U.S. Provisional Patent Application No. 62/159,894 filed on May 11, 2015, entitled "REAPER," which are hereby incorporated by reference in their entirety for all that is taught and disclosed therein.

FIELD OF THE INVENTION

The present invention relates to firearms and shields, and more particularly to a support structure for a shield and weapons system that allows the user to operate a protective shield and/or weapons system for much longer periods of time compared to an unsupported shield and/or weapons system.

BACKGROUND OF THE INVENTION

For several years, military and law enforcement agencies have been researching and developing products that assist the individual firearm operator with gear carriage and operation. A significant emphasis has been placed on increasing an operator's load bearing abilities utilizing body armor, weapons carriage, and backpack mounting advancements. The end goal is to provide equipment that provides the user with enhanced functionality while reducing weight and effort required.

For example, giving a user the ability to carry a shield or a shield and weapon system combination at a ready position is a force multiplier option that requires equipment to reduce the user's effort required to carry the heavy shield. In addition, heavier shields that provide greater protection often require the user to use both hands to carry the shield, thereby preventing the user from also carrying a rifle or side arm in a ready position. Furthermore, although one prior art solution to the problem of carrying a heavy shield is to mount the heavy shield on wheels, the wheels limit shield maneuverability and do not eliminate the need for the heavy shield to be carried when the user encounters rough terrain or stairs that the wheels cannot navigate.

Referring now to FIGS. 1-3, an example of prior art equipment that seeks to achieve somewhat similar objectives in the field of handheld camera operation is the Easyrig® 3 Cinema manufactured by EASYRIG AB of Umeå, Sweden. The Easyrig® 3 Cinema, generally designated by the reference numeral 10, is shown in use holding a camera 12 over the shoulder 14 of the wearer 16 in FIGS. 1-2, and with the camera at the level of the wearer's hips 18 in FIG. 3. The Easyrig® 3 Cinema seeks to transfer the load of the camera from the wearer's back 20 and shoulders to the hips to reduce fatigue and increase the steadiness of the camera.

The Easyrig® 3 Cinema includes a frame 22 that defines a frame axis 40 and is connected to a hip and back support 24 by upper and lower adjustment clamps 26, 28 with upper and lower adjustment knobs 30, 32. The location of the transfer of the weight of the handheld camera 12 to the wearer's hips is controlled by the side support struts 34, 36. A boom 38 extending upward and to the right of the frame has a downward facing exit aperture 42 for a cable 44. A camera hook 46 releasably connects a handheld camera to the cable. A shock absorber and pulley system (not shown) internal to the frame and boom holds the majority of the weight of the camera while also helping to steady the camera by creating moderate resistance to movement. The cable has a sufficient length to enable the camera to be moved as far as the user's arms 48 can reach, which enables shooting at both hip and shoulder level.

Although the Easyrig® 3 Cinema is suitable for its intended field of use in handheld camera operation, it has a number of disadvantages that make it unsuitable for use as a support structure for a shield or a weapons system. The boom's exit aperture for the cable is intended for use with an object with a center of mass located directly below the exit aperture. Since a handheld camera is held over the wearer's shoulder or against the wearer's hip, the boom's exit aperture functions as intended. However, the center of mass of a shield or weapons system is located well forward of these positions and the wearer's torso when the shield is held at a ready position, especially in the standing position (see FIGS. 4 and 16-20). As a result, the cable rubs on the boom at the exit aperture, which has the potential for causing cable failure with disastrous consequences if a dangerous high-powered weapons system or a shield is attached to the cable instead of a camera.

Other features of the boom make the boom unsuitable for use as a support structure for a shield or a weapons system. The boom is quite large and bulky and presents itself too much if pointed towards an enemy position. The boom is also enclosed, which makes it extremely difficult for the wearer to access the boom's internal components if maintenance or repair is required, making it unsuitable for repair in the field.

Additional characteristics of the Easyrig® 3 Cinema that make it unsuitable for use as a support structure for a shield or a weapons system include a handheld-camera specific camera hook attachment mechanism that does not adequately support a weapons system or a shield and cannot be quickly released if immediate separation of the object being supported by the Easyrig® 3 Cinema is required. The wearer must adjust the Easyrig® 3 Cinema utilizing the adjustment knobs and side support adjustments, and must use a custom rigid metal and plastic attachment system and back support to wear the Easyrig® 3 Cinema, which prevents the wearer from also wearing utility vests, body armor, and/or backpacks during use. Finally, the Easyrig® 3 Cinema utilizes a single shock absorber to hold the majority of the weight of the camera, which does not provide any redundancy in the event the shock absorber were to fail, and which instead creates sudden loss of support. This is a very dangerous outcome if a high-powered weapons system or a heavy shield is attached to the cable instead of a camera.

Therefore, a need exists for a new and improved support structure for a shield and weapons system that allows the user to operate a shield and/or weapon system for much longer periods of time compared to an unsupported shield and/or weapons system. In this regard, the various embodiments of the present invention substantially fulfill at least some of these needs. In this respect, the support structure for a shield according to the present invention substantially departs from the conventional concepts and designs of the prior art, and in doing so provides an apparatus primarily developed for the purpose of providing a device support structure for a shield and/or weapons system that allows the user to operate a shield and/or weapon system for much longer periods of time compared to an unsupported shield and/or weapon system.

SUMMARY OF THE INVENTION

The present invention provides an improved support structure for a shield and/or weapon system, and overcomes the above-mentioned disadvantages and drawbacks of the prior art. As such, the general purpose of the present invention, which will be described subsequently in greater detail, is to provide an improved support structure for a shield and/or weapon system that has all the advantages of the prior art mentioned above.

To attain this, the preferred embodiment of the present invention essentially comprises a frame adapted for connection to a wearer, the frame having an elongated first portion defining a frame axis and adapted for positioning adjacent to the spine of the wearer, the frame having an upper end, a boom connected to the upper end of the frame and having a first boom portion extending away from the frame, and a second boom portion angled with respect to the first boom portion and extending away from the frame axis, the boom having a free end, a cable reel mechanism connected to the frame, a cable having a first end connected to the cable reel mechanism and a free end extending from the free end of the boom and adapted to connect to the shield, and the cable reel mechanism including a biasing facility to exert tension on the cable, such that tension on the cable provides support for the shield. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
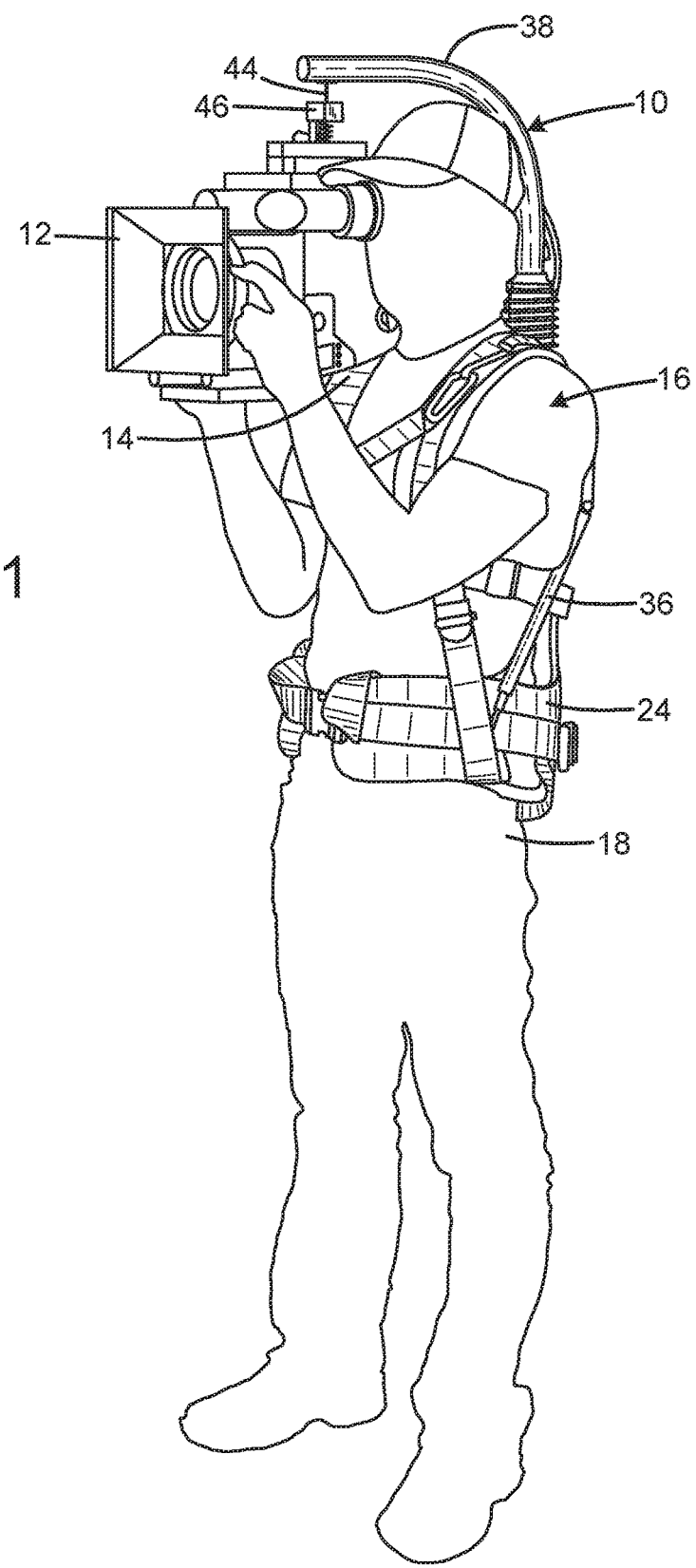
FIG. 1 is a front isometric view of a prior art Easyrig® 3 Cinema portable camera support with the camera on the user's shoulder.
Figure 2:
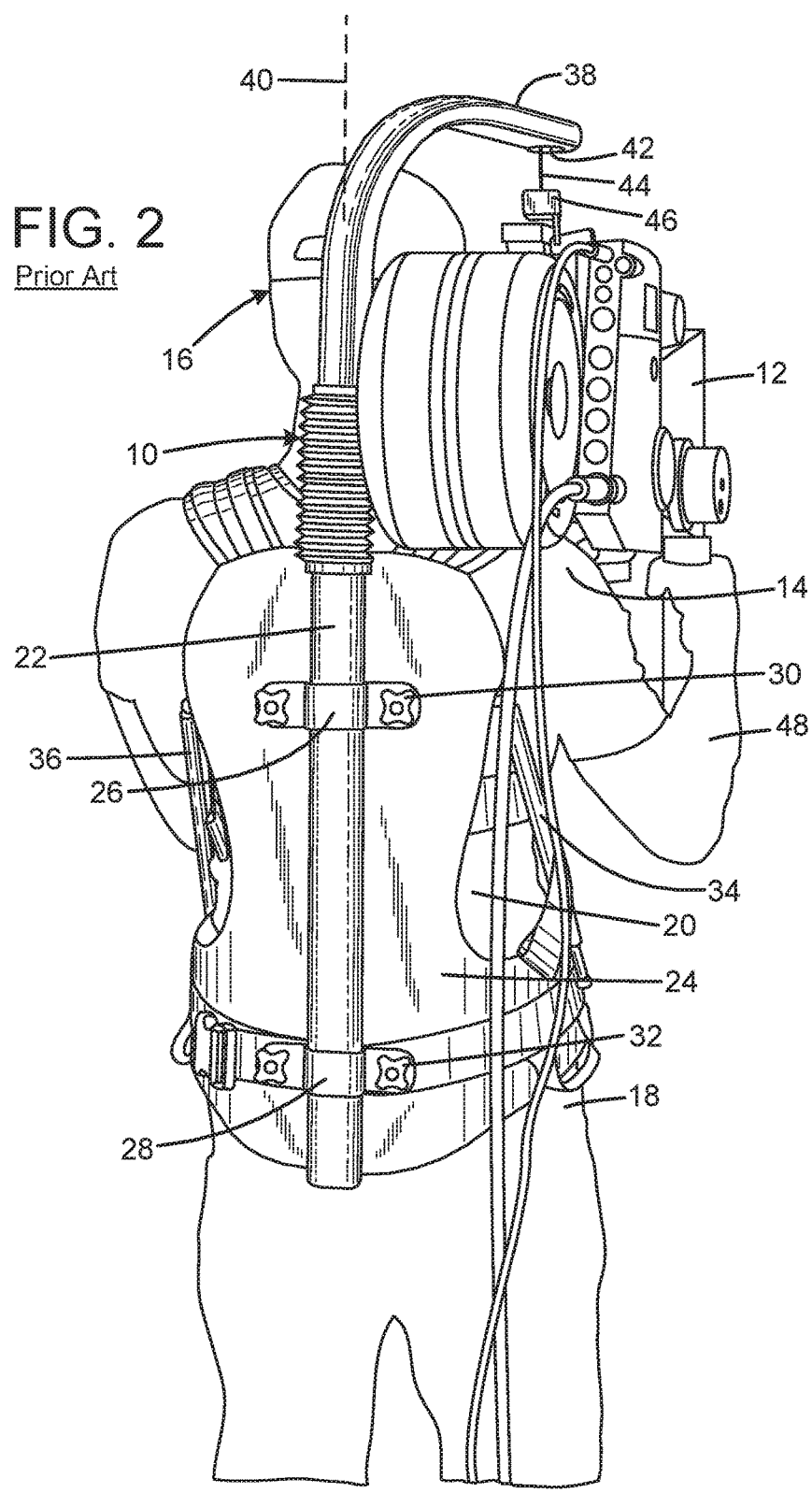
FIG. 2 is a rear isometric view of the prior art Easyrig® 3 Cinema portable camera support of FIG. 1 with the camera on the user's shoulder.
Figure 3:
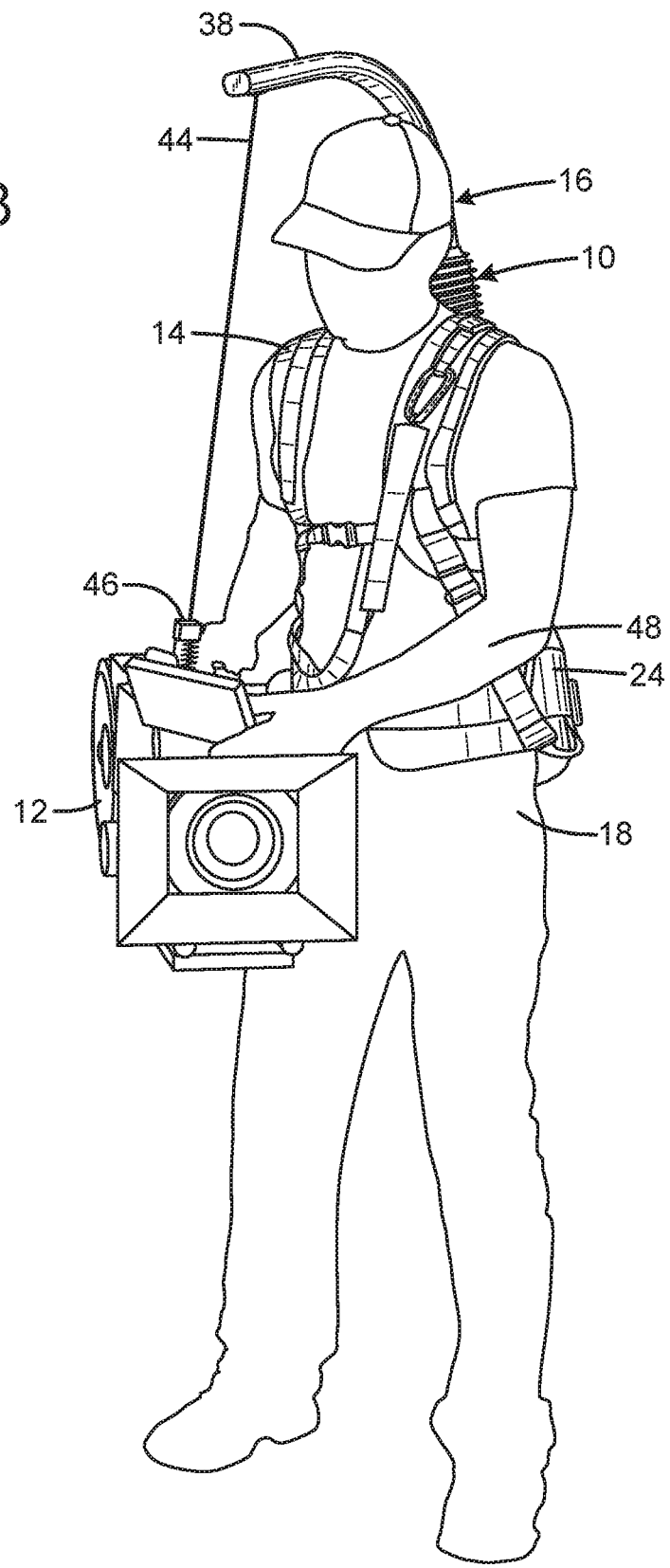
FIG. 3 a front isometric view of a prior art Easyrig® 3 Cinema portable camera support of FIG. 1 with the camera extended forward at the user's hip level.

An embodiment of the support structure for a shield and weapons system of the present invention is shown and generally designated by the reference numeral 100.

FIGS. 4-12 illustrate the improved support structure for a shield and weapons system 100 of the present invention. More particularly, the support structure has a frame 102 having a right side 104, left side 106, upper end 108, lower end 110, front 300, and rear 308. The frame defines a frame axis 112, has a hollow interior 118, and is closed at the lower end by bottom cap 116 and at the upper end by top cap 114. Upper bolts 304 and lower bolts 302 secure a cable reel mechanism 306 within the interior of the frame. The cable reel mechanism will be described in more detail in the discussion of FIGS. 7, 8, and 11. The top cap defines a central aperture 120.

A boom 122 is pivotally attached to the upper end 108 of the frame 102 by an elongated portion 176 of a pivot shaft 128 received within the central aperture 120 of the top cap 114. The boom also has a right side plate 124, left side plate 126, front lower plate 130, rear lower plate 132, front upper plate 134, and rear upper plate 136. The right side plate has a right free end 138, right lower end 140, and apertures 142, 144, 146, 148. The left side plate has a left free end 150, left lower end 152, and apertures 154, 156, 158, 160. The front lower plate has a right edge 162, left edge 164, and bottom edge 166. The rear lower plate has a right edge 168, left edge 170, and bottom edge 172. In addition to the elongated portion, the pivot shaft has a head 174, a notch 178, and central bore 180. The front upper plate has a right edge 182 and a left edge 184. The rear upper plate has a right edge 186 and a left edge 188.

When the boom 122 is assembled, the right lower end 140 of the right side plate 124, left lower end 152 of the left side plate 126, bottom edge 166 of the lower front plate 130, and bottom edge 172 of the rear lower plate 132 are received within the notch 178 of the pivot shaft 128 and secured by welding in the current embodiment. The right edges 162, 168, 182, 186 of the lower front plate, lower rear plate, upper front plate, and upper rear plate are welded to the right side plate. The left edges 164, 170, 184, 188 of the lower front plate, lower rear plate, upper front plate, and upper rear plate are welded to the left side plate. The lower front plate, lower rear plate, upper from plate, and upper rear plate are used to help hold the right and left side plates in place and to improve weld adhesion of the right and left side plates to the pivot shaft 128.

In the assembled state, the boom 122 defines a channel 282 between the right side plate 124 and left side plate 126, a first boom portion 286, and a second boom portion 288. The channel within the first boom portion 286 is axially registered with the bore 180 in the pivot shaft 128. The first boom portion extends vertically away from the frame 102 along the frame axis 112, and the second boom portion is angled with respect to the first boom portion and extends away from the frame axis.

Hex bolts 190, 192, 194, 196 are received in the apertures 154, 156, 158, 160 of the left side plate 126. Hex nuts 198, 200, 202, 204 are received in the apertures 142, 144, 146, 148 of the right side plate 124. The hex bolts have heads 206, 212, 218, 224, smooth portions 208, 214, 220, 226, and threaded portions 210, 216, 222, 228. The hex nuts have heads 230, 234, 238, 242 and smooth portions 232, 236, 240, 244. The hex nuts also have threaded central bores (not visible) that receive the threaded portions of the hex bolts. The hex bolts and nuts mount spacers 248, 258, 268, 278 within the channel 282. The spacers have bores 250, 260, 270, 280 that are rotatably mounted on the smooth portions of the hex bolts and nuts. A front upper pulley 252 having a cable groove 254 and bore 256 is mounted on spacer 258. An intermediate upper pulley 262 having a cable groove 264 and bore 266 is mounted on spacer 268. A rear upper pulley 272 having a cable groove 274 and a bore 276 is mounted on spacer 278. Spacer 248 omits a pulley and serves as a cable support element 246. An exit aperture 284 at the forwardmost portion of the channel is defined between the cable support element, front upper pulley, right free end 138 of the right side plate, and the left free end 150 of the left side plate.

The free end 292 of a cable 290 extends upwards through the bore 180 in the pivot shaft 128, is guided forwards within the channel 282 by the cable grooves 274, 264, 254 in the rear upper pulley 272, intermediate upper pulley 262, and front upper pulley 252, and exits the channel by passing through exit aperture 284. A clip 294 is attached to the free end of the cable. A cable stop 298 is attached to the cable behind the free end. The cable stop is larger than the exit aperture and keeps the free end of the cable spaced apart from the boom by preventing the free end of the cable from being retracted back into the channel by the cable reel mechanism 306.

A shield and weapons system attachment mechanism with quick release 296 is connected to the clip 294. The shield and weapons system attachment mechanism with quick release is connected to an intermediate portion 402 of a weapons system 400, which is a rifle in the current embodiment. The shield and weapons system attachment mechanism with quick release enables the weapon system and/or shield to be easily and swiftly disengaged from the cable 290 when necessary. The quick release is manufactured to a military specification that allows it to be used by soldiers and law enforcement under their rigid requirements. The quick release system is also required by aviation regulators for users in airframes.

The quick release 296 is attached permanently to the free end 292 of the cable 290. The quick release is then attached to a specific weapon and/or shield mounting attachment that is designed to support a specific weapon and/or shield. Because of different configurations, weapon and shield sizes, and usage conditions, the use of a customized mounting attachment is important because a mounting attachment suitable for a smaller carbine or shield will cause mechanical issues with a larger machine gun or shield. There are four distinct weapon mounting attachments that can be connected to the quick release depending on the weapon to be attached.

The support structure for a shield and weapons system 100 has the considerable advantage of enabling the wearer to easily access the parts contained within the channel 282 and the frame 102 and replace them if necessary so that any needed repairs can be performed in the field. The open boom 122 provides the user with access to the cable 290 for field stripping and maintenance if the cable is damaged in combat.

Figure 7:
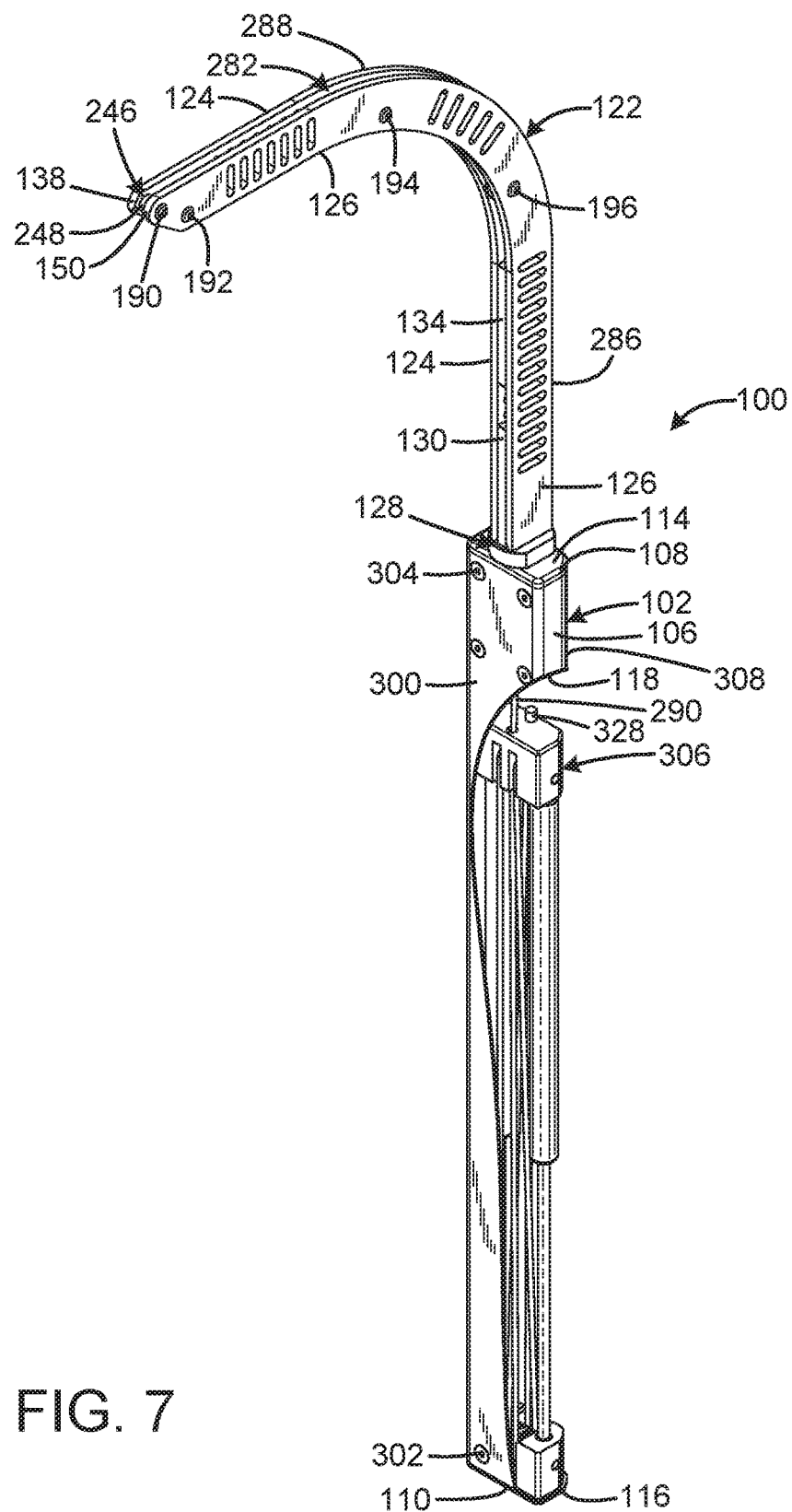
FIG. 7 is a front isometric view of the frame and boom of FIG. 4 with the frame cutaway to expose the cable reel mechanism of the present invention.
Figure 8:
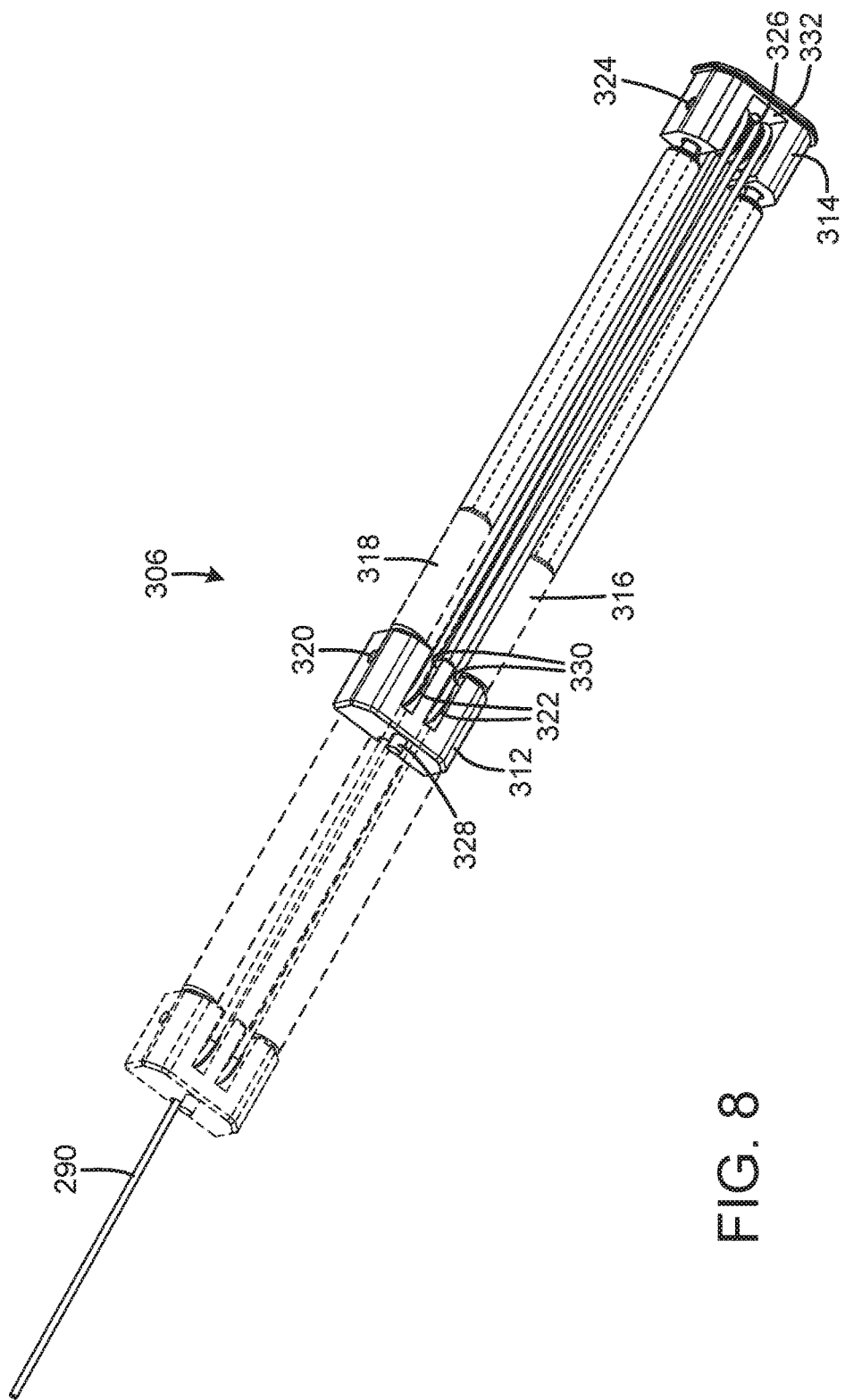
FIG. 8 is a front isometric view of the cable reel mechanism of the present invention.
Figure 9:
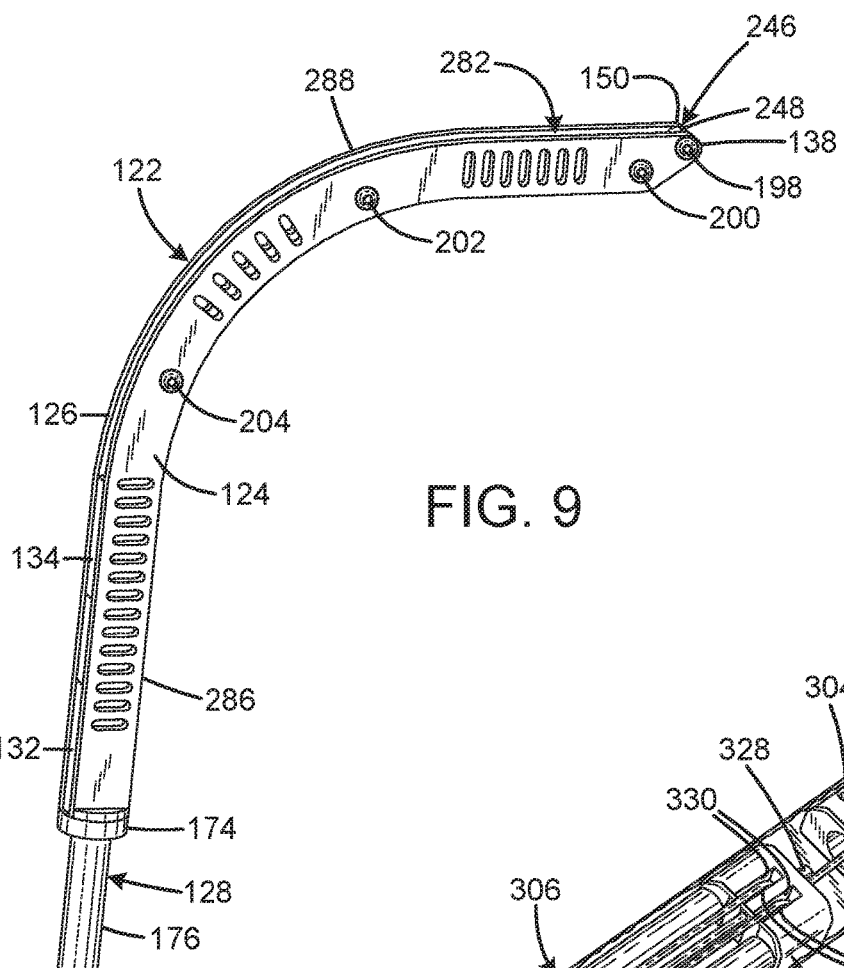
FIG. 9 is a right isometric view of the boom of FIG. 4.
Figure 10:
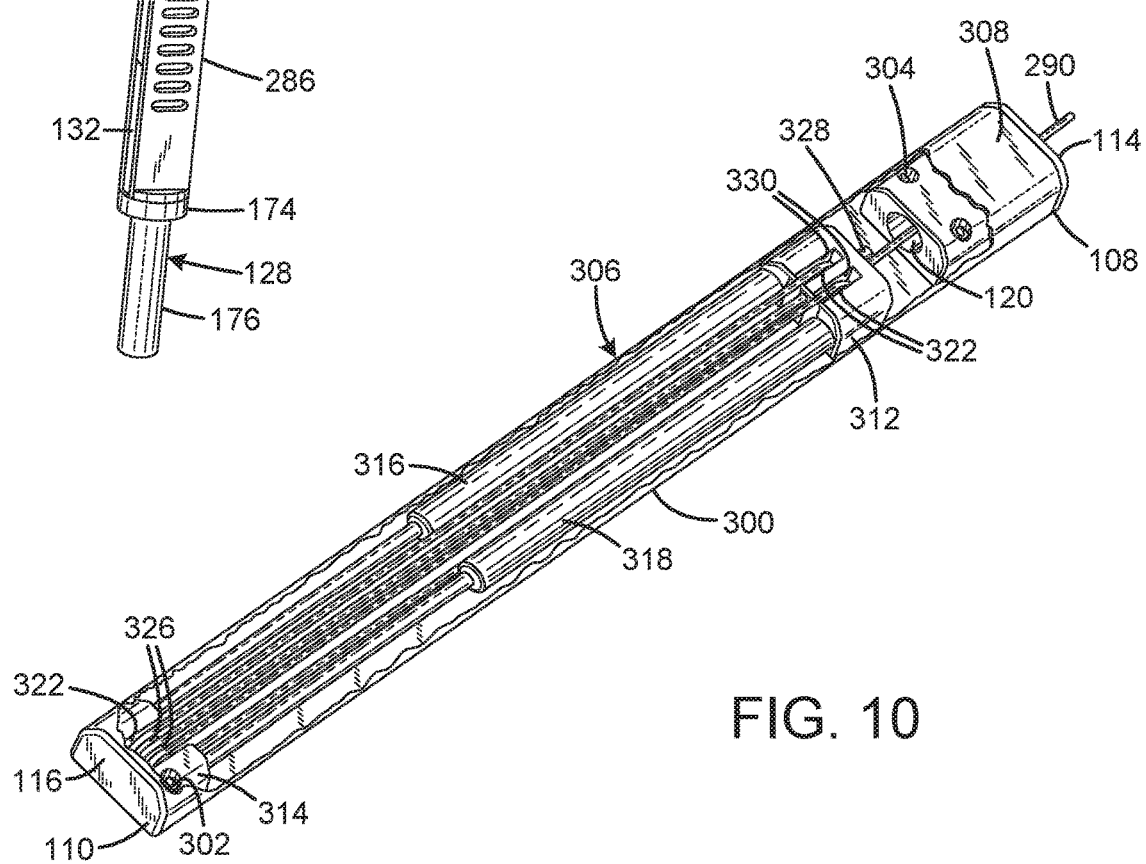
FIG. 10 is a rear isometric view of the frame of FIG. 4 with the frame cutaway to expose the cable reel mechanism of the present invention.
Figure 11:
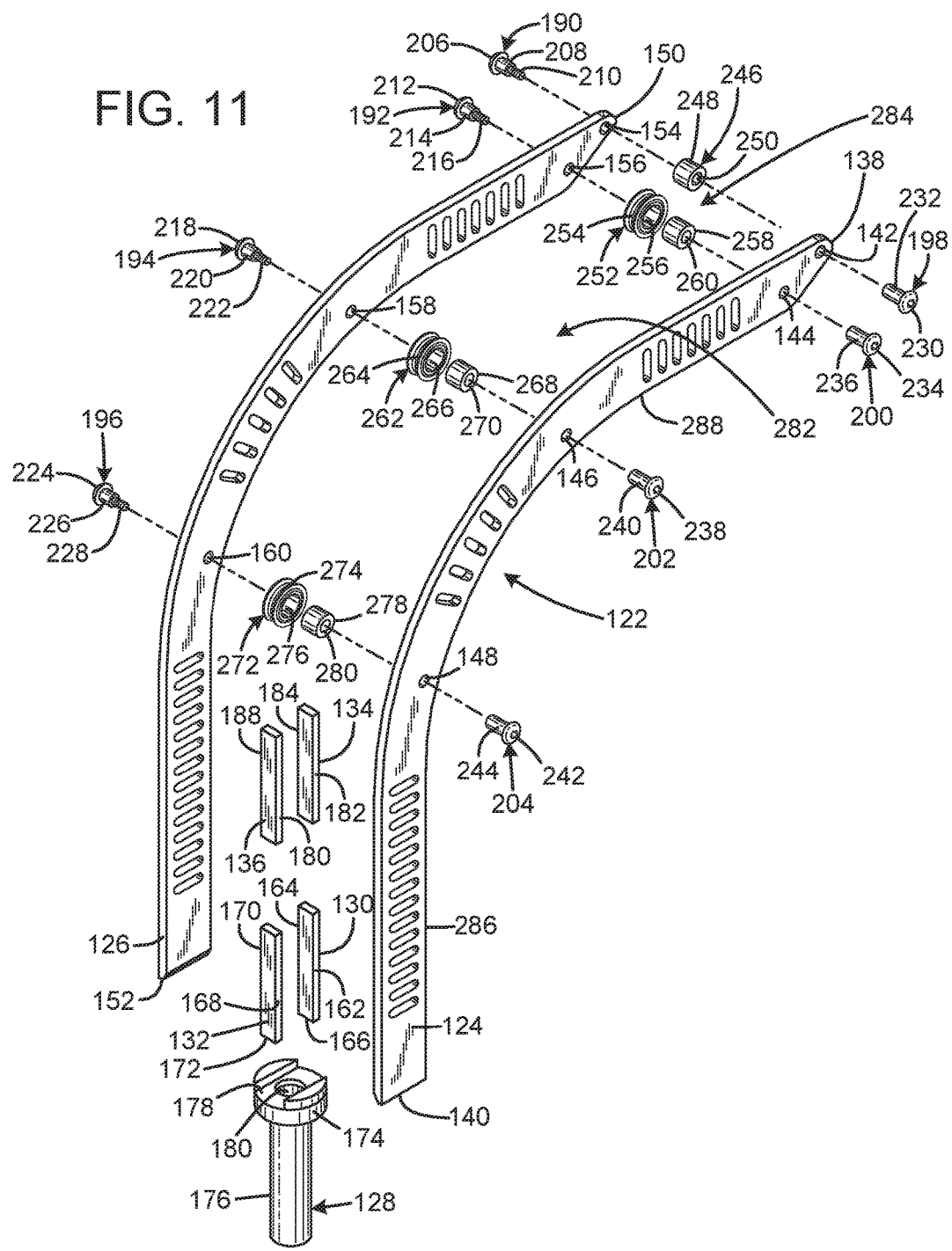
FIG. 11 is an exploded view of the boom of FIG. 4.

FIGS. 7, 8, and 10 illustrate the improved cable reel mechanism 306 of the present invention. More particularly, the cable reel mechanism has an upper pulley head 312 and a lower pulley head 314 that are connected together by a pair of pneumatic springs in the form of left shock absorber 316 and right shock absorber 318. The upper pulley head has a transverse shaft 320 that rotatably mounts two upper pulleys 322 within two channels 330. The lower pulley head has a transverse shaft 324 that rotatably mounts three lower pulleys 326 within a channel 332. Together these form a cable take-up mechanism between the pneumatic springs that supports the cable 290. A cable capture 328 retains the opposed end of the cable and prevents the opposed end of the cable from pulling out from the cable reel mechanism. The cable reel mechanism exerts tension on the cable and resists withdrawal of the cable from the frame 102, thereby supporting a shield 400 attached to the free end 292 of the cable and transferring the weight of the weapon system and/or shield to the user's hips via the frame 102 and belt rig 506. Two shocks are used to provide redundancy and avoid sudden loss of complete support of the shield and/or weapons system, which would potentially be very dangerous. The dashed lines in FIG. 8 illustrate the fully extended position of the cable reel mechanism, and the solid lines illustrate the fully compressed position of the cable reel mechanism. The cable reel mechanism includes a block and tackle mechanism of limited length providing an extended range of cable payout length relative to the limited length of the block and tackle mechanism.

In the current embodiment, the left and right shock absorbers 316, 318 are each 200 N gas springs. However, the gas spring system can be configured from 80 N to 800 N of combined compression force, depending upon the spring choice. The cable reel mechanism 306 has a 6:1 ratio, which requires the application of 67 N of force with the 2×200 N gas springs to create movement. If the cable reel mechanism is inverted relative to the position shown in FIG. 7, the ratio is reduced to 5:1, which requires an extra 13 N of force to create movement with the 2×200 N gas springs. The inverted position is essential for supporting larger caliber, and therefore heavier, weapon systems, such as medium and heavy machine guns, large caliber rifles, and/or rifles with heavy optical scopes or other attachments, as well as heavy shields. The shock absorbers can be accessed by the user in the field so they can be inverted as needed, thereby allowing a single support structure for a shield and weapons system 100 be configured as needed to support a wider variety of attached shields and weapons systems.

The upper and lower pulley heads 312, 314 are made of a self-lubricating plastic material such as polytetrafluoroethylene in the current embodiment, which enables smooth travel of the upper pulley block within the frame 102 because of self-lubrication. The upper and lower pulleys 322, 326 and the front upper pulley 252, intermediate upper pulley 262, and rear upper pulley 272 are made of polyoxymethylene in the current embodiment to provide high stiffness, low friction and excellent dimensional stability. The pulleys enable smooth movement of the cable 290, which is essential for sniper and other applications requiring extremely precise shield movements. The upper and lower pulley heads are through bolted for strength and have threaded brass inserts that receive the lower and upper bolts 302, 304 and the ends of the left and right shock absorbers to increase durability. Although the cable is held under tension like the Easyrig® 3 Cinema's cable 44, the cable retracts at half the speed of the Easyrig® 3 Cinema's cable if the quick release 296 is initiated. This slower retraction feature is important for safe use of lighter weapons systems and shields.

In the current embodiment, the frame 102 is an aluminum extrusion with a generally trapezoidal cross-section that is 30 mm×55 mm with a 1.5 mm thick sidewall. The frame extrusion is shaped to accommodate the dual shock absorber cable reel mechanism 306, has a larger surface area positioned against the utility vest 508 for stability in operation, and is lightweight and strong to operate in harsh conditions. The boom 122 is made of 6061 aluminum in the current embodiment, is shaped via waterjet computer-aided cutting processes, and is finished with multicam camouflage dipping technology. The right and left side plates 124, 126 are made of aluminum with a thickness of 4.75 mm. The side plates are sufficiently thick to be strong and durable, but are minimally bulky to have a minimalist visual signature when pointed towards an enemy position. The complete boom has a weight of 510 g in the current embodiment. The spacers 248, 258, 268, 278 are made of aluminum in the current embodiment and, in combination with the hex nuts and bolts, pinch and hold the right and left side plates in place to keep the side plates straight and parallel after welding. The sleeves 510, 512, 414 are made of military-specification nylon fabric in the current embodiment. The cable 290 is made of poly-paraphenylene terephthalamide in the current embodiment for strength and durability.

Figure 12:
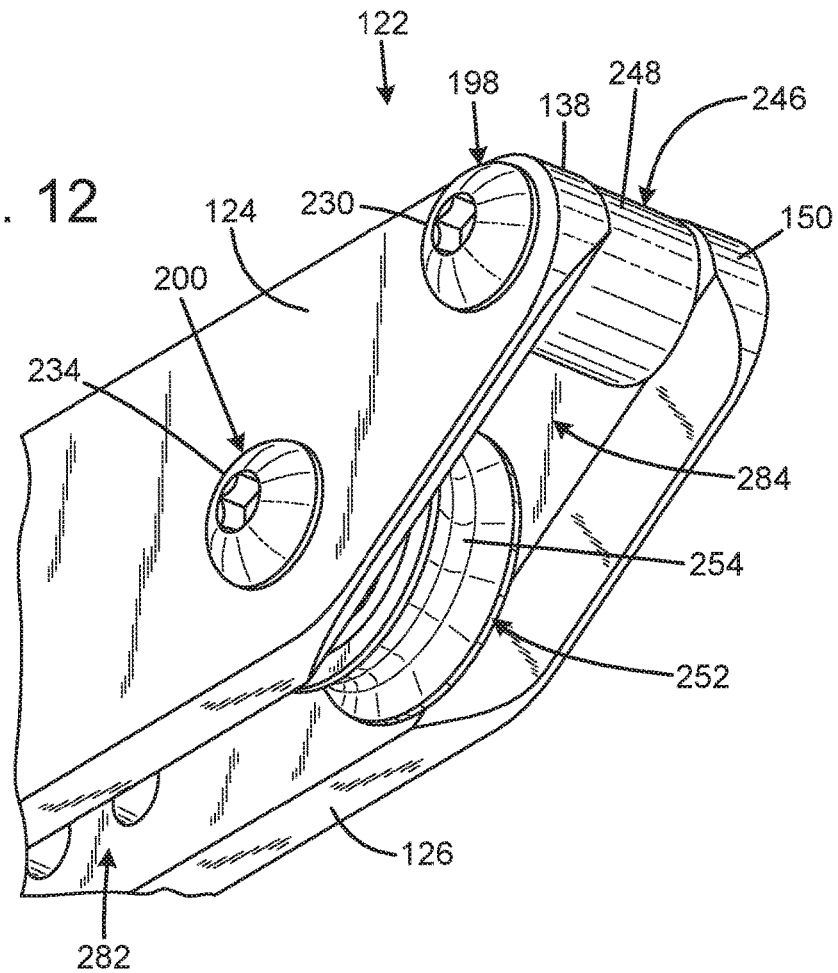
FIG. 12 is a front isometric fragmentary view of the boom of FIG. 4.
Figure 13:
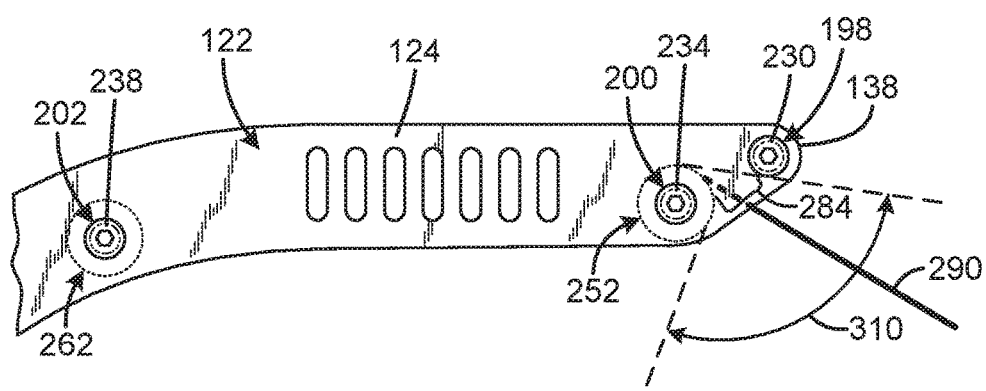
FIG. 13 is a right side fragmentary view of the boom of FIG. 4.

FIGS. 12-13 illustrate the improved exit aperture 284 of the present invention. More particularly, the exit aperture is defined by the space between the right side plate 124, left side plate 126, cable support element 246 with spacer 248, and front upper pulley 252. Because the support point at the intermediate portion 402 of a shield 400 in the ready position is well forward of the exit aperture rather than directly below the exit aperture, the exit aperture has to allow for at least 30° of displacement from the frame axis, and preferably 120° of displacement (denoted by the double-headed arrow 310) of the cable 290 without causing the cable to rub and wear on the boom 122. The cable is positioned at an angle close to horizontal when the attached weapons system is a large machine gun. This range of cable movement is accomplished by providing an angled exit aperture that opens both forward and downward, with the cable support element at the top to prevent the cable from rubbing and wearing on the boom, and the front upper pulley 252 at the bottom to assist with smooth movement of the cable in and out of the exit aperture. The exit aperture faces at least partly away from the frame axis 112, and is open in a forward direction away from the frame axis, such that the cable may angle away from the frame 102 at an angle without contacting the boom 122.

Figure 4:
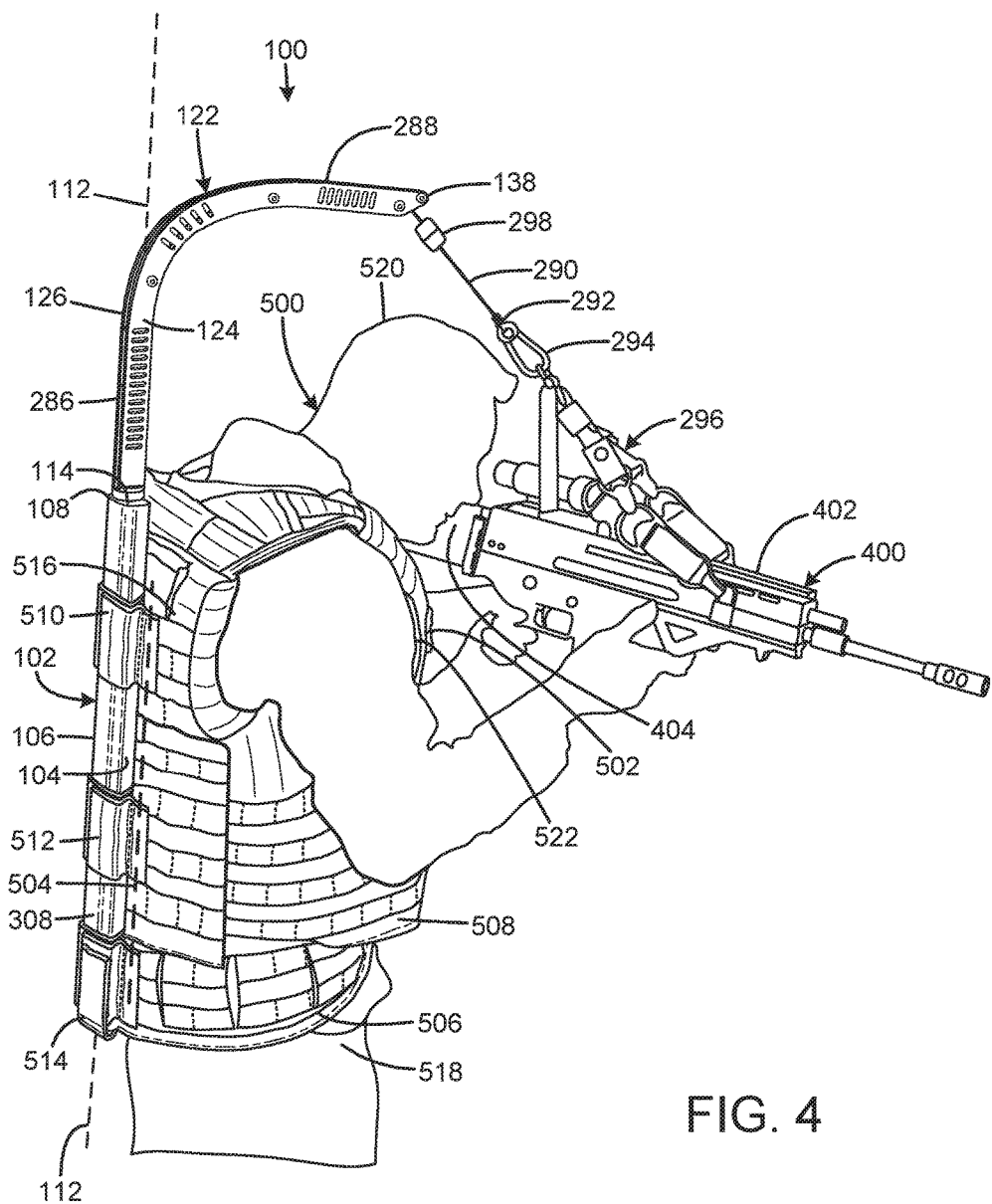
FIG. 4 is a rear isometric view of the current embodiment of a support structure for a shield and weapons system constructed in accordance with the principles of the present invention in use.
Figure 5:
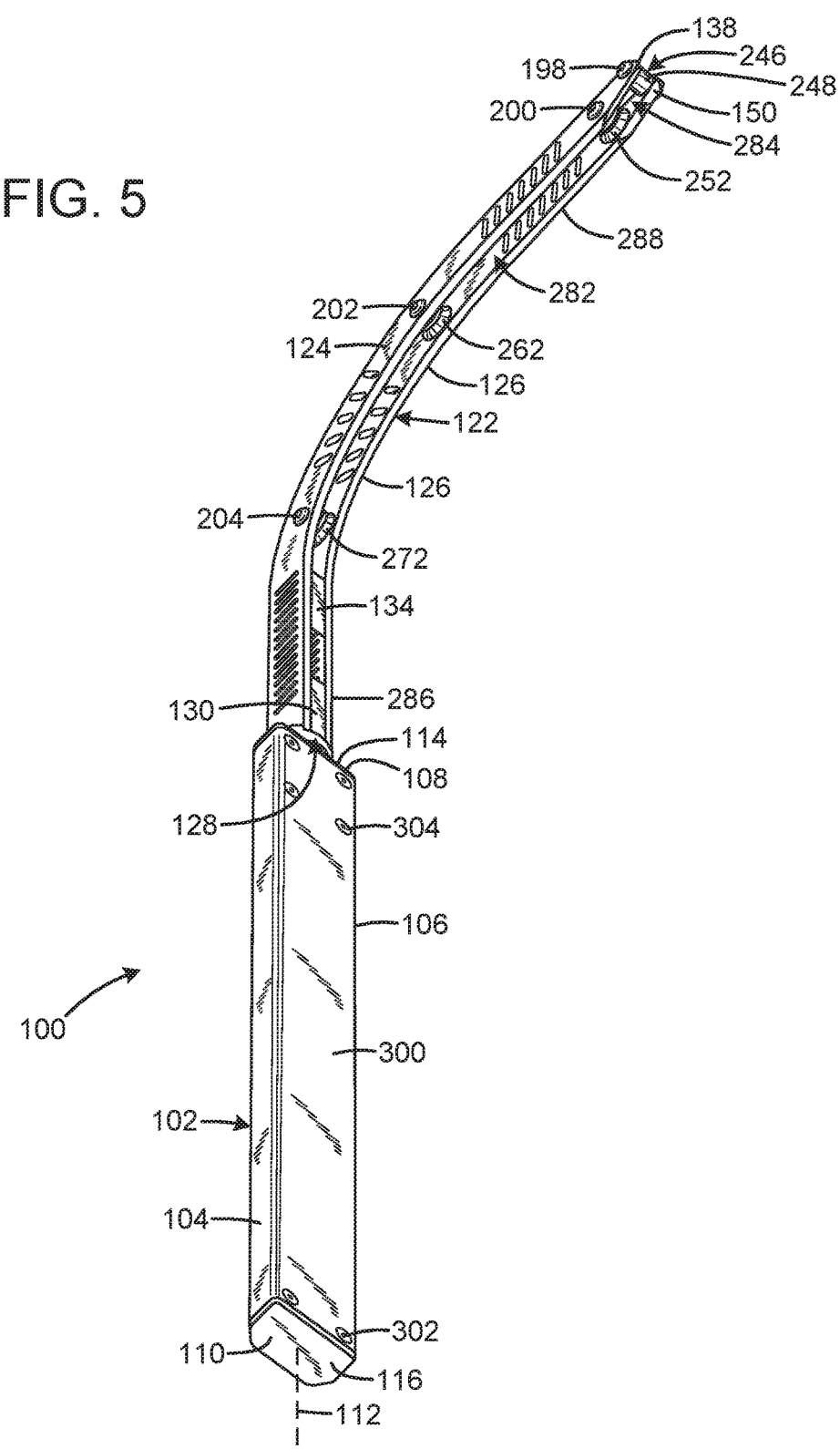
FIG. 5 is a front isometric view of the frame and boom of FIG. 4.
Figure 6:
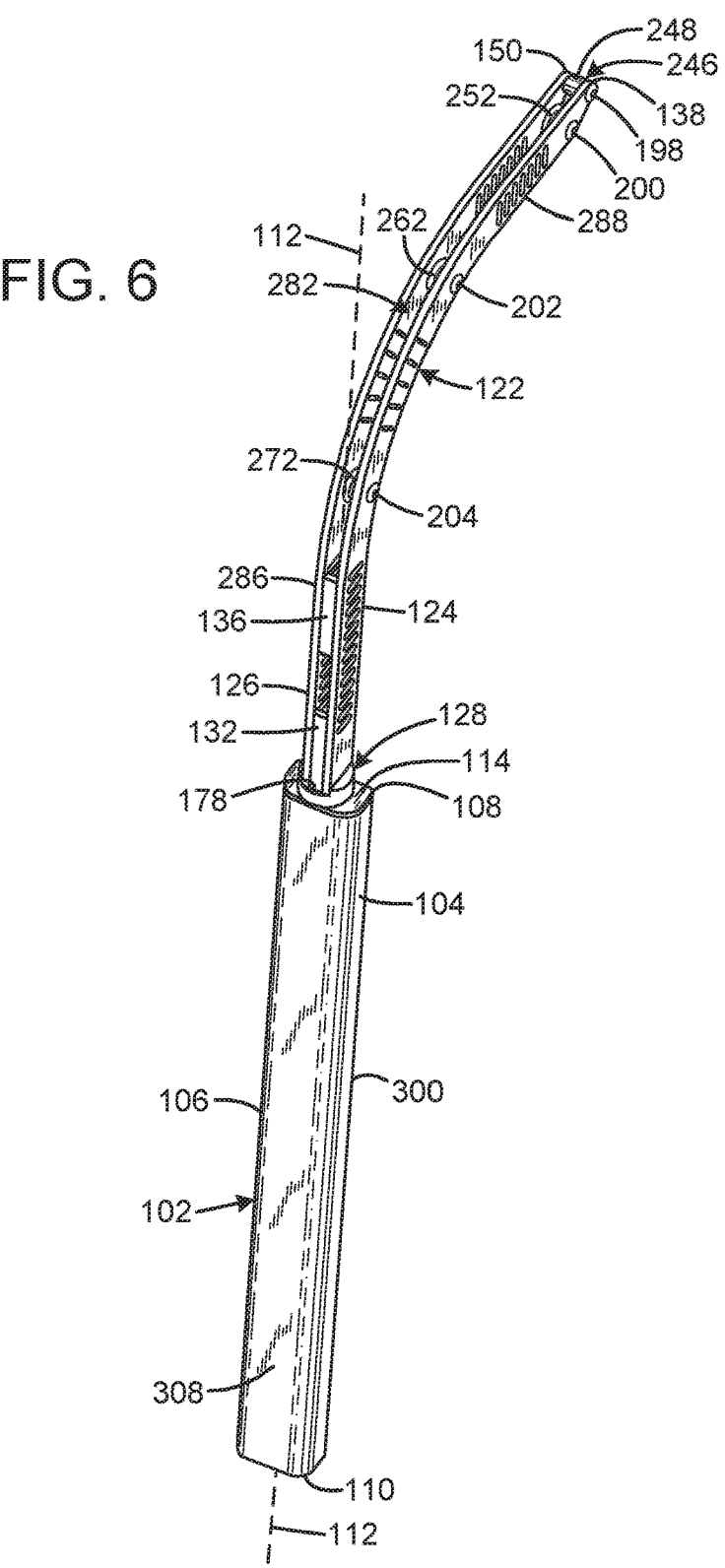
FIG. 6 is a rear isometric view of the frame and boom of FIG. 4.

Referring now to FIG. 4, the support structure for a shield and weapons system 100 is shown in use being worn by a wearer 500 in the standing position. The wearer is shown wearing a standard Modular Lightweight Load-carrying Equipment (MOLLE) utility vest 508 covering the wearer's chest 502 and back 516, and a MOLLE belt rig 506 around the wearer's hips 518. An upper sleeve 510, intermediate sleeve 512 are removably attached to the utility vest in line with the wearer's spine 504, and the bottom sleeve 514 is removably attached to the belt rig in line with the wearer's spine. The sleeves are strong, yet flexible, eliminate the need for side supports and adjustment struts, and enable a customizable fit using the MOLLE attachment points on the utility vest and belt rig. In use, the frame 102 portion of the support structure for a shield is removably inserted into the sleeves such that the lower end 110 is received within the bottom sleeve, the upper end 108 protrudes above the upper sleeve, and the front 300 of the frame faces the wearer's back. The first boom portion 286 of the boom 122 extends upward in alignment with the frame axis 112 so that the second boom portion 288 can curve forward above the wearer's head 520. The support structure for a shield and weapons system 100 supports an attached weapon far forward of the exit aperture 284 of the boom with the user 500 leaning his or her head 520 forward and canting his head to create a "cheek weld" to the stock of the weapon being employed. In contrast, the Easyrig® 3 Cinema is designed for the user to be standing upright with his or her head in a normal erect position, which does not work for shooting.

Figure 14:
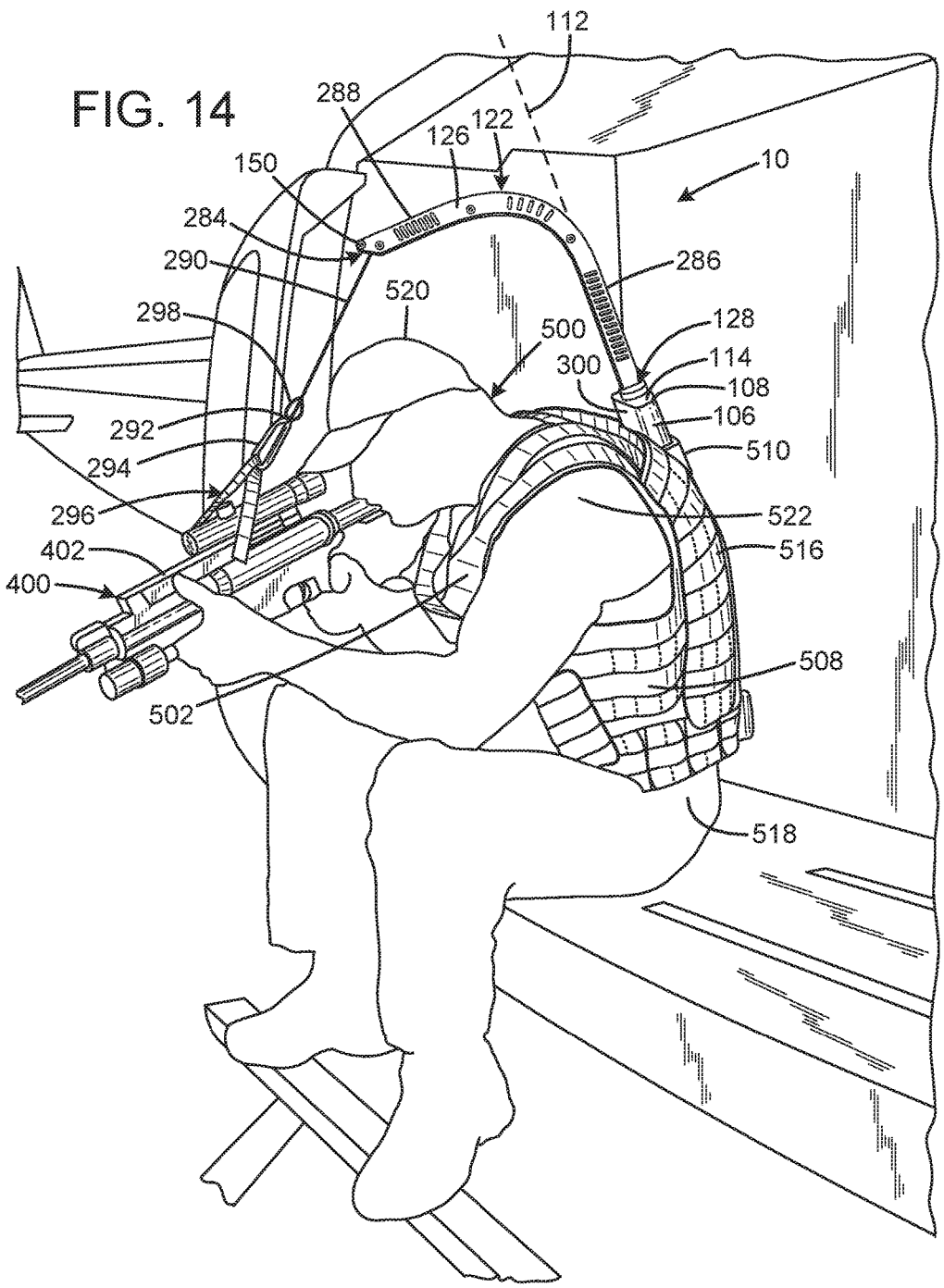
FIG. 14 is a left side isometric view of the support structure for a shield and weapons system of FIG. 4 in use in a rotary wing aircraft.
Figure 15:
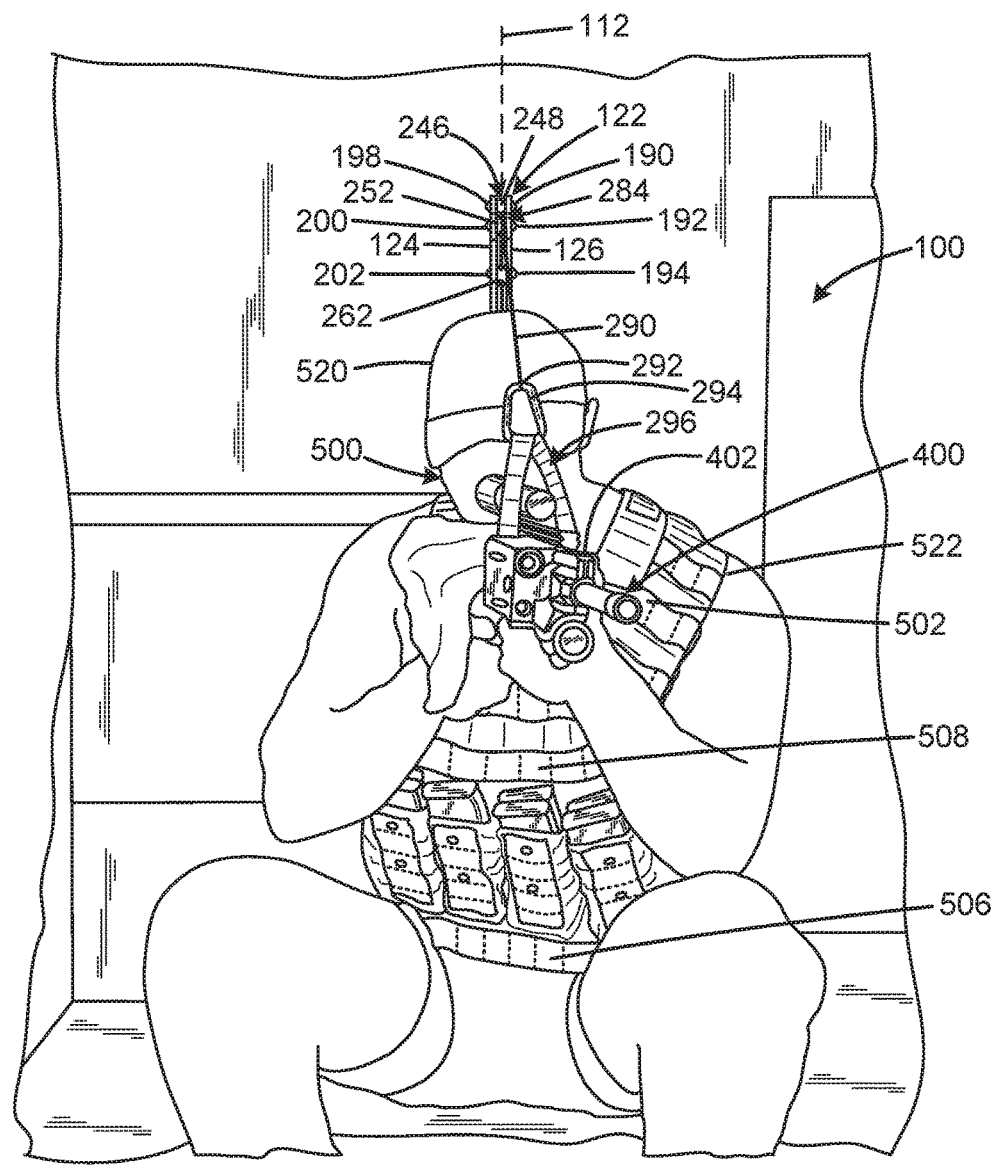
FIG. 15 is a front view of the support structure for a shield and weapons system of FIG. 4 in use in a rotary wing aircraft.
Figure 16:
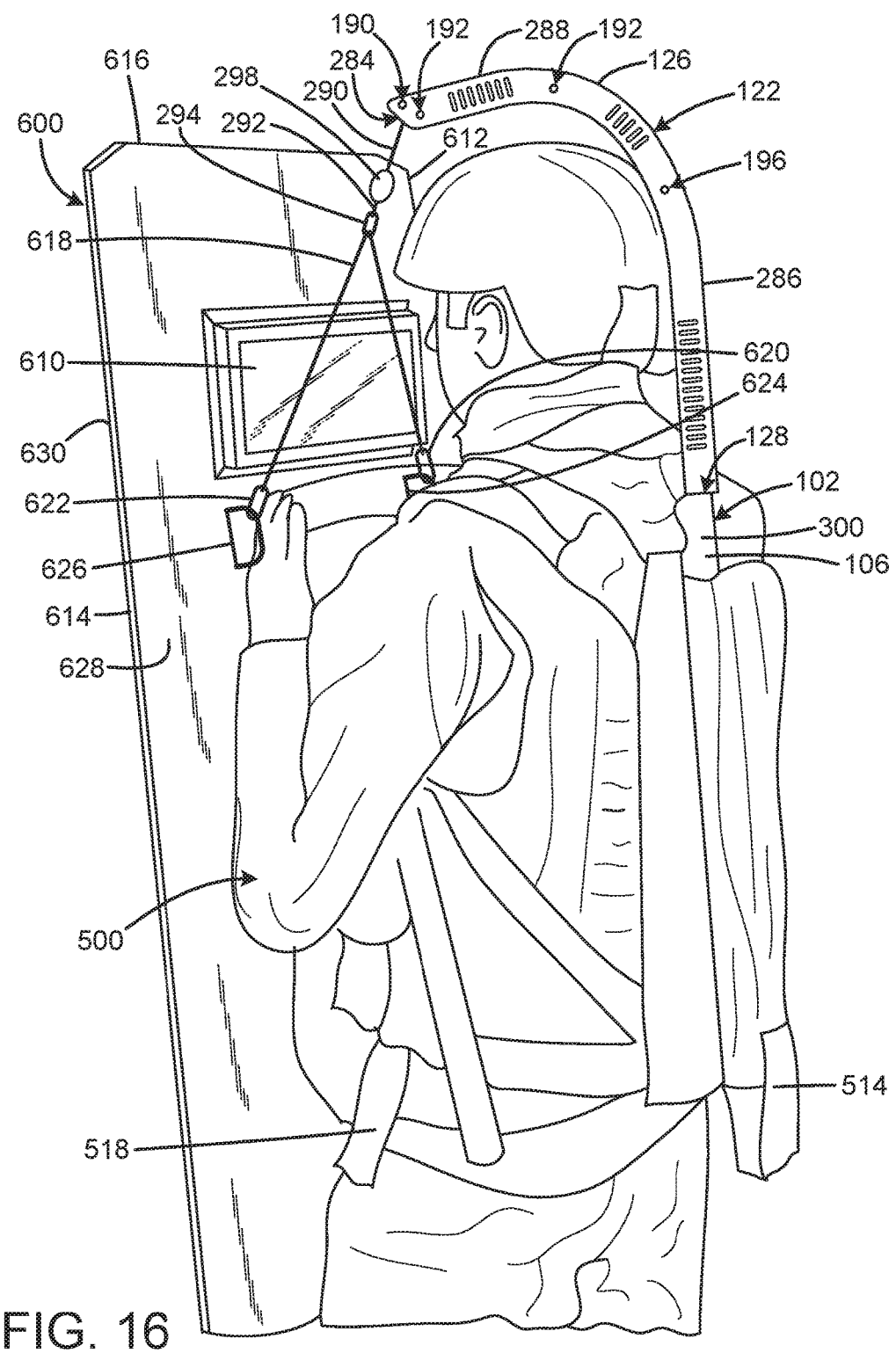
FIG. 16 is a rear perspective view of the support structure for a shield and weapons system of FIG. 4 in use supporting a shield with a viewing port.
Figure 17:
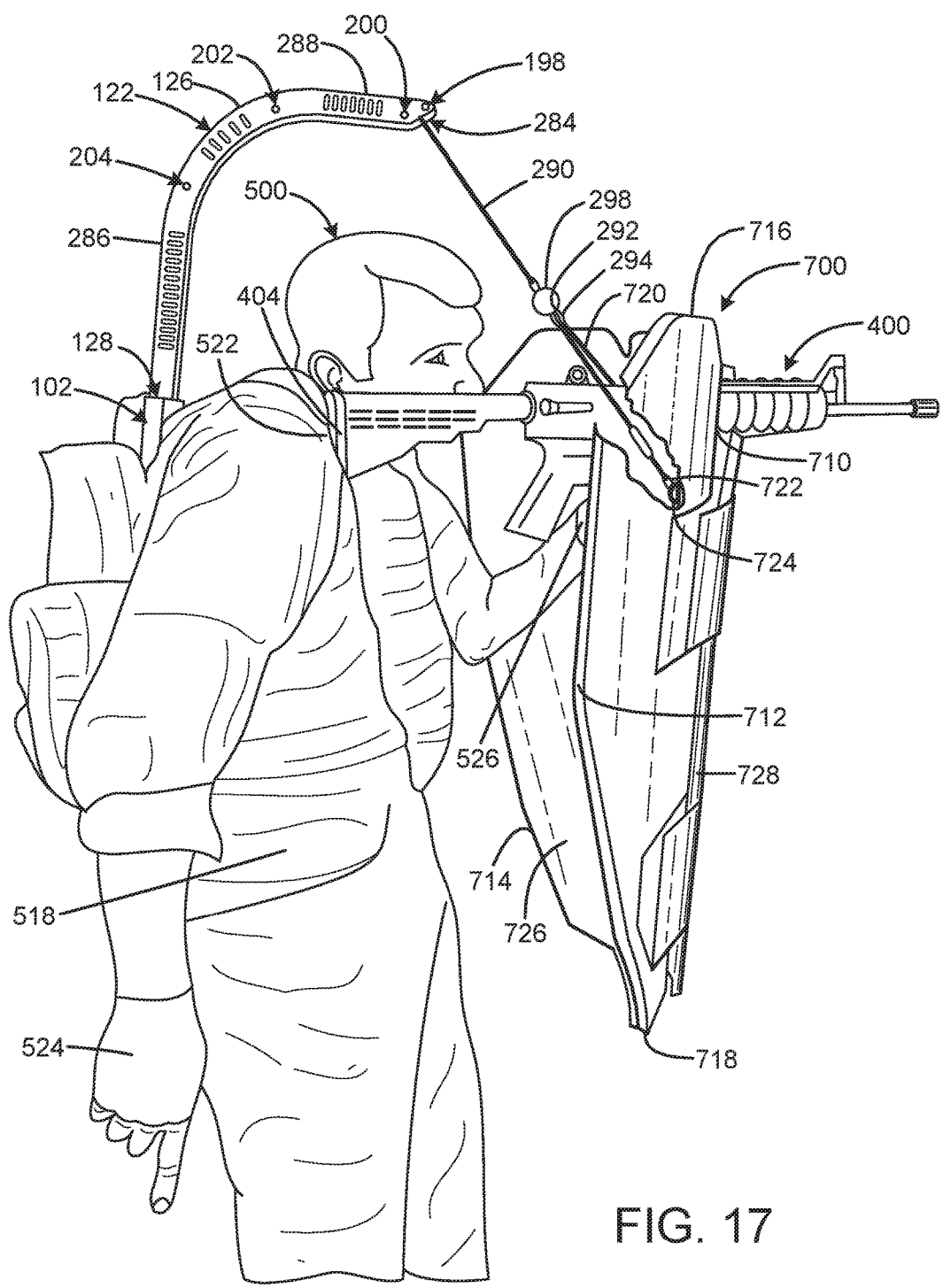
FIG. 17 is a right side view of the support structure for a shield and weapons system of FIG. 4 in use supporting a shield with an upper firearm rest.
Figure 18:
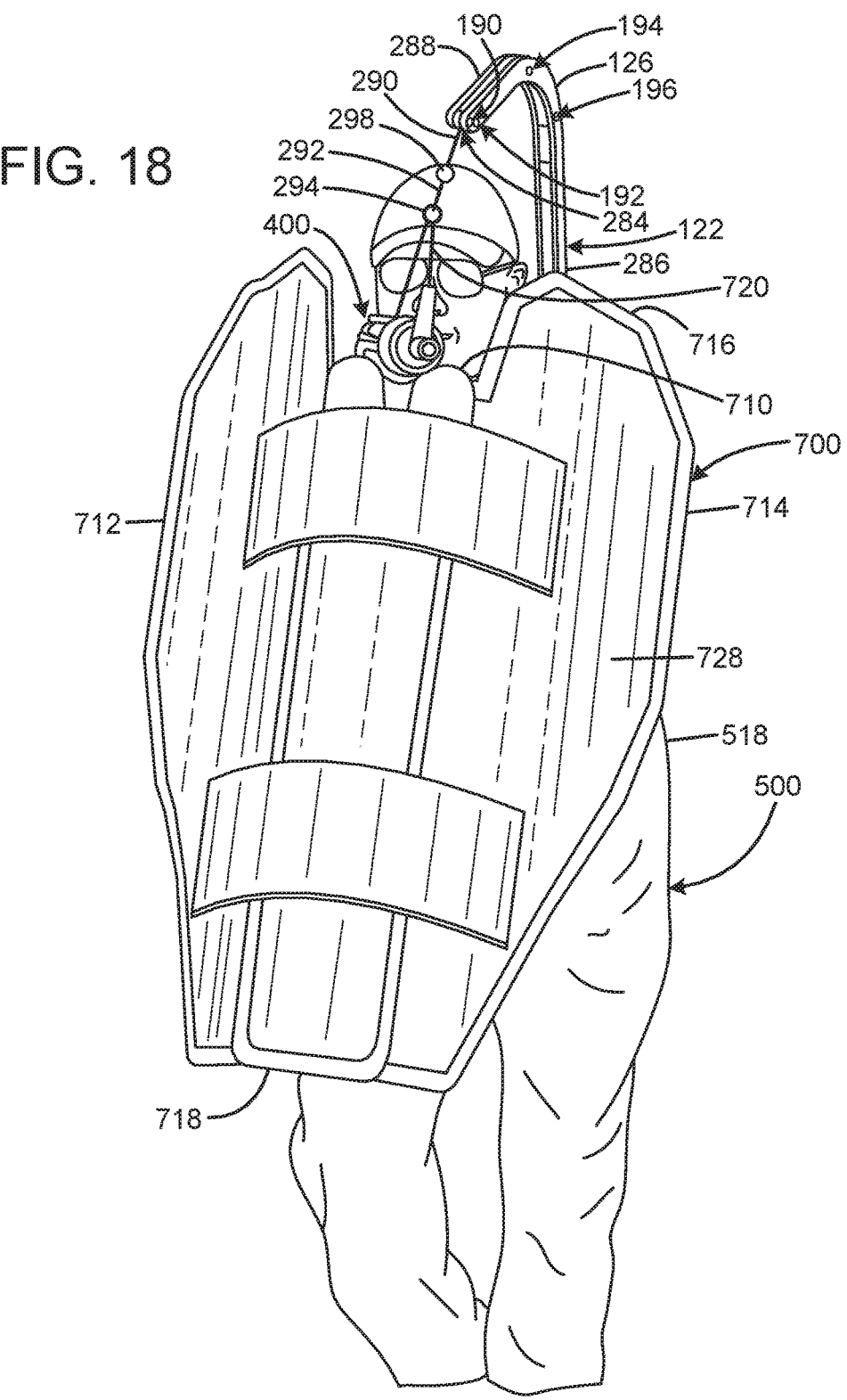
FIG. 18 is a front view of the support structure for a shield and weapons system of FIG. 4 in use supporting the shield of FIG. 17.

Referring now to FIGS. 14-15, the support structure for a shield and weapons system 100 is shown in use being worn by a wearer 500 in the seated position in a rotary wing aircraft. As is also the case in the standing position, the support structure for a shield and weapons system supports the weapons system in alignment with the wearer's spine 504 with the boom extending forward on a medial plane of the wearer directly over the wearer's head 520 rather than off to one side. The cable reel mechanism transfers the weight of the attached weapons system 400 to the wearer's hips 518, and the free end 292 of the cable 290 urges the weapons system to exert a compressive force on the wearer's chest 502. The support structure for a shield and weapons system enables the wearer to switch between the standing and seated positions without requiring any adjustments, and enables the wearer to still hold the weapons system in the comfortable, natural shooting position he or she is accustomed to with the butt 404 of the weapons system on the wearer's shoulder 522. The support structure for a shield and weapons system also enhances accuracy by stabilizing shooting from rotary wing aircraft.

Regardless of the wearer's position, the support structure for a shield and weapons system 100 enables the wearer to hold aim on target for much longer periods of time and with higher levels of stability compared to an unsupported weapons system. The support structure for a shield and weapons system improves sight management, trigger control, operational endurance, and shot follow through of the user by removing the majority of muscular and skeletal load from the wearer. The weapons system enables the shooter to employ the same level of accuracy that was previously reserved for those shooting in the prone position. This allows the user to be more effective and permits safer and better tactics to be employed.

The support structure for a shield and weapons system 100 also enables the ability to shoot one-handed by supporting the attached weapon well forward of the exit aperture 284 of the boom 122 that would be severely inhibited if the weapon were supported vertically directly beneath the boom. Vertical support of the weapon directly beneath the boom also does not allow for the traditional shooting stance that shooters use to control and manage recoil. Recoil management is one of the most important aspects that need to be addressed to shoot accurately and repeatedly during combat. Therefore, it is not sufficient for the support structure for a shield and weapons system 100 to merely support a weapon, but the weapon must be supported in a way that promotes recoil management. The forward weapons support position enabled by the support structure for a shield and weapons system 100 also pushes the stock into the shooter's shoulder, which greatly aids recoil management.

Figure 19:
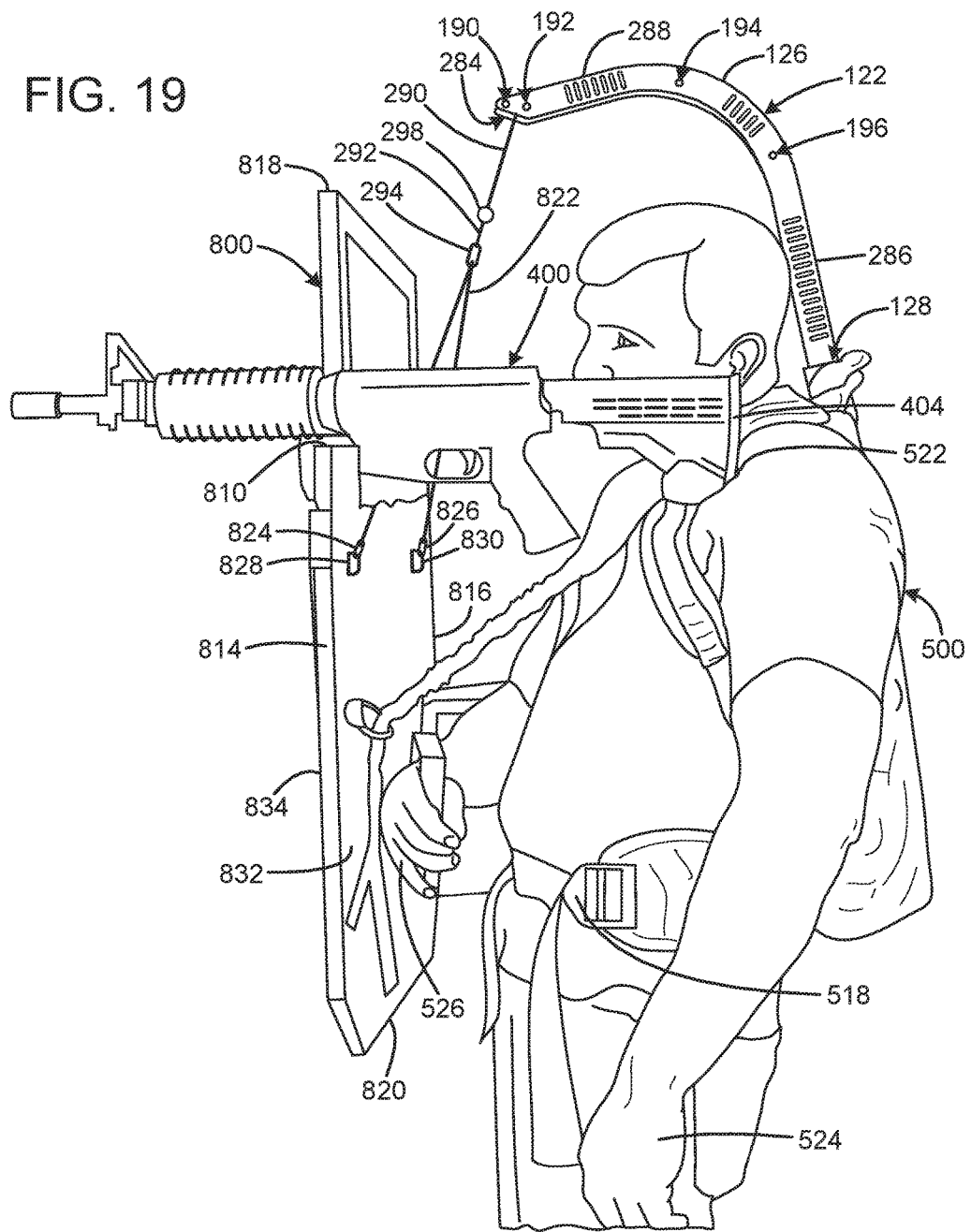
FIG. 19 is a left side view of the support structure for a shield and weapons system of FIG. 4 in use supporting a shield with opposing side firearm rests.
Figure 20:
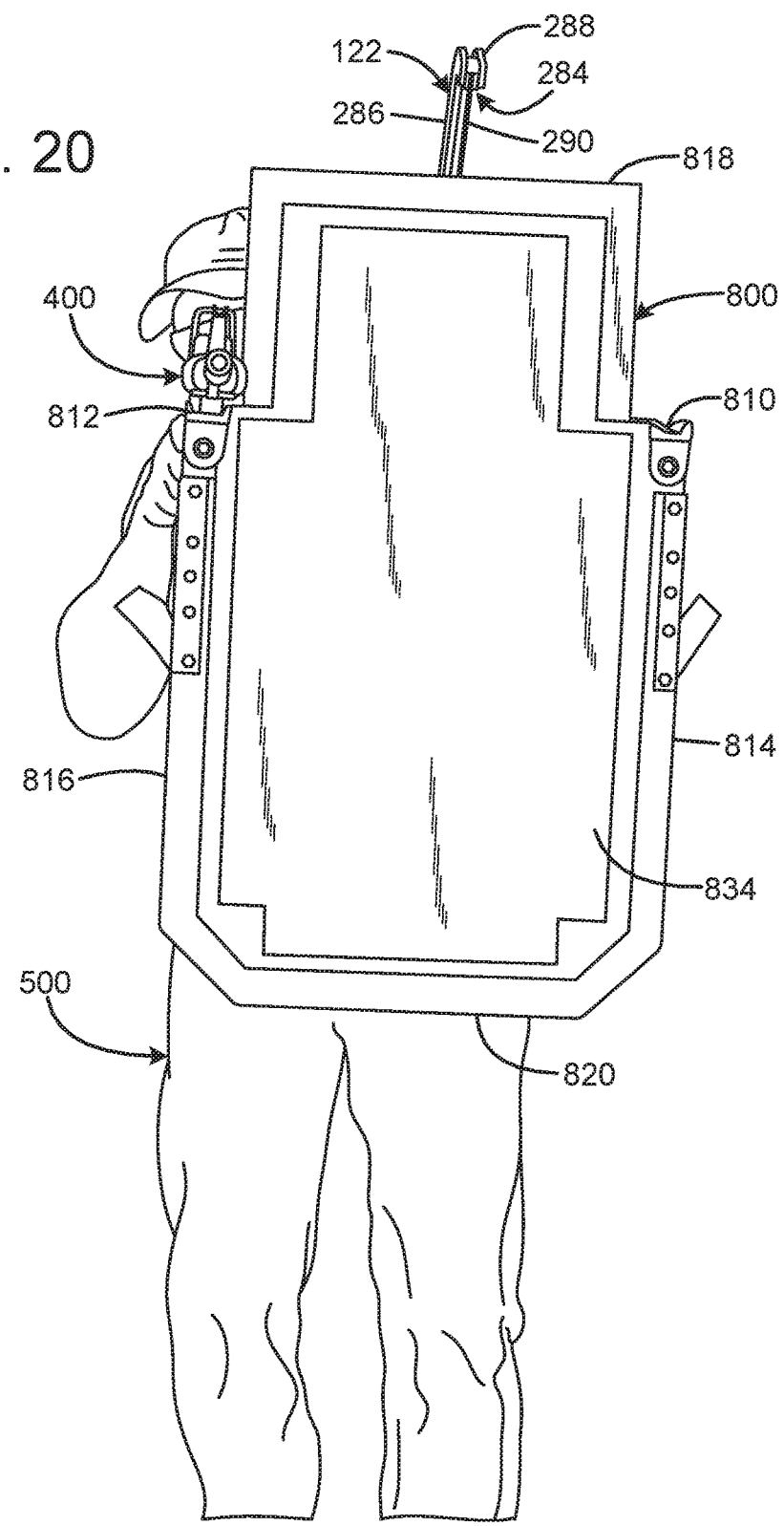
FIG. 20 is a front view of the support structure for a shield and weapons system of FIG. 4 in use supporting the shield of FIG. 19.

Referring now to FIGS. 16-20, the support structure for a shield and weapons system 100 is shown in use being worn by a wearer 500 to support a shield 600 with viewing port 610 (FIG. 16), a shield 700 with an upper firearm rest 710 (FIGS. 17 and 18), and a shield 800 with opposing side firearm rests 810, 812 (FIGS. 19 and 20). The shield 600 has a right 612, left 614, top 616, bottom (not visible), rear 628, and front 630. A right D-ring 624 and a left D-ring 626 are attached to the rear of the shield. A shield cable 618 has an intermediate portion connected to clip 294 and opposing ends connected to the D-rings by a right clip 620 and a left clip 622.

The shield 700 has a right 712, left 714, top 716, bottom 718, rear 726, and front 728. A right D-ring 724 and a left D-ring (not visible) are attached to the rear of the shield. A shield cable 720 has an intermediate portion connected to clip 294 and opposing ends connected to the D-rings by a right clip 722 and a left clip (not visible).

The shield 800 has a left 814, right 816, top 818, bottom 820, rear 832, and front 834. A left D-ring 828 and a right D-ring 830 are attached to the rear of the shield. A shield cable 822 has an intermediate portion connected to clip 294 and opposing ends connected to the D rings by a left clip 824 and a right clip 826.

The cable reel mechanism 306 transfers the weight of the attached shield 600, 700, 800 or shield and weapon 400 combination to the wearer's hips 518. The wearer can carry the weight of up to level IV ballistic shields without requiring the use of both hands to support the shield, thereby enabling the wearer to also carry a rifle or side arm in a ready position. The wearer can also rapidly swivel even heavy shields left, right, up, and down to adjust for the changes in the tactical situation.

The angle of the cable 290 brings the attached shield 600, 700, 800 back into the wearer 500 for greater control of the shield. In the case where the shield possesses a firearm rest 710, 810, 812, the free end 292 of the cable urges the shield against the magazine well 406 of the weapon system 400 to create axial compression between the shield and the wearer's shoulder 522. This compression enables the wearer to still hold the weapon system in the comfortable, natural shooting position he or she is accustomed to with the butt 404 of the weapon system on the wearer's shoulder. The user can also use his or her shooting hand 524 to reload the weapon system or perform other countermeasures without losing control of the weapon system while using his or her other hand 526 to control the shield.

While a current embodiment of a support structure for a shield and weapons system has been described in detail, it should be apparent that modifications and variations thereto are possible, all of which fall within the true spirit and scope of the invention. For example, although a MOLLE utility vest and belt rig have been disclosed, the current invention is suitable for use with any body armor, other military apparel, and backpacks that are MOLLE-enabled. Furthermore, the support structure for a shield and weapons system disclosed is also suitable for civilian hunting applications in addition to the disclosed military and law enforcement applications. In addition, although rifles have been disclosed, the support structure for a shield and weapons system is also suitable for use with medium and heavy machine guns and other firearms of comparable weight, including large caliber rifles and/or rifles with heavy optical scopes or other attachments. Although a welded aluminum boom has been disclosed, the boom can also be made from injection molded plastic or via 3D printing. Although the shield being attached to the free end of the cable has been disclosed, an intermediate cable or array of cables can also connect the shield to the free end of the cable to ensure the shield remains balanced and held at the desired elevation and orientation with respect to the wearer. Finally, the support structure for a shield and weapon system is suitable for use with any type of shield, including riot shields, transparent shields, shields defining gun ports, shields defining viewing ports, and ballistic shields. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of suspending a protective shield that presses a weapons system against a wearer comprising the steps of:
   providing a frame with a cable reel mechanism and an extending boom from which a free end of a cable extends under tension;
   connecting the frame to the back of a wearer;
   connecting a portion of a shield having a weapons system support to the free end of the cable;
   positioning a forend of the weapons system in the weapon system support;
   positioning a butt of the weapons system on the wearer's shoulder; and
   extending the cable at an angle away from the user to generate a compressive force on the shoulder from the shield pressing against the weapons system.

2. The method of claim 1 wherein the angle is at least 30 degrees from the vertical when the frame is in a vertical orientation.

3. The method of claim 1 including positioning the boom directly over the wearer's head.

4. The method of claim 1 wherein the weapons system is selected from the group consisting of rifles, medium machine guns, and heavy machine guns.

5. The method of claim 1 wherein the shield is selected from the group consisting of riot shields, transparent shields, shields defining gun ports, shields defining viewing ports, and ballistic shields.

\* \* \* \* \*